INVENTORS
ERIC WINSTON
EDWARD M. FRANK
BY
Hopgood & Calimafde
ATTORNEYS

INVENTORS
ERIC WINSTON
EDWARD M. FRANK
BY
Hopgood & Calimafde
ATTORNEYS

United States Patent Office 3,544,921
Patented Dec. 1, 1970

3,544,921

SIGNAL DISTRIBUTION SYSTEM COMPRISING A HIGH FREQUENCY INDUCTIVE COUPLER

Eric Winston, Melrose Park, and Edward M. Frank, Churchville, Pa., assignors to Jerrold Electronics Corporation, Hatboro, Pa., a corporation of Delaware

Filed Dec. 9, 1968, Ser. No. 782,120
Int. Cl. H01p *5/14;* H03h *7/48*
U.S. Cl. 333—6 2 Claims

ABSTRACT OF THE DISCLOSURE

A split housing signal distribution station for series connection within a main signal carrying coaxial cable line. A parallel wire directional inductive coupler enclosed in the coupler half of the housing, detects signals upon a main transmission line, and supplies them to a hybrid splitter mounted in the other half of the housing, which supplies a series of feeder taps which angle 30° down from the housing and generally along the main cable line. A quick-disconnect fitting connects the splitter and the coupler when the housing is assembled.

The wires of the coupler are sandwiched between two boards of plastic dielectric, which in turn are sandwiched between grounded conducting plates. One of said conducting plates is peripherally grounded to the edges of the coupler housing. The wires are circuitously laid between the boards to achieve a selected electrical length. One end of the coupled wire is connected to the center contact of the quick-disconnect fitting, and the other end is connected through a resistor to one of the grounded conducing plates. The other wire is connected in series with the center conductor of the main cable line.

BACKGROUND

The invention is in the field of equipment for distribution of electrical signals; and more particularly for distribution of signals through Community Antenna Television (CATV) systems.

The efficiency and performance of such systems depends in large part upon the ability of the equipment utilized to take program signals from a main transmission line, and distribute them to subscribers with a minimum of loss in signal strength. It is also desirable that the transmission lines be protected from interference, and distortions which can be introduced by feed back from drop lines and subscriber's receivers.

Losses and interferences have occurred in prior art signal distribution devices, where the distribution circuitry has been connected to its housing at discrete points.

It is therefore an objective of this invention to provide an inductive coupler and signal distributon station wherein losses to and interference from the housing thereof are substantially eliminated.

It is an objective of this invention to provide a signal distribution station with low insertion loss and which functions to provide a signal to many TV sets having a substantially uniform signal level over a broad frequency range.

It is also an objective of this invention to provide a parallel wire directional inductive coupler of simple and durable construction and great electrical stability over a broad temperature range.

It is a further objective of this invention to provide means, separable from said inductive coupler, for splitting the signal removed from the main transmission line by the aforementioned directional inductive coupler and distributing it to a number of taps feeding subscriber cables.

It is an additional objective of this invention to provide a signal distribution station having an inductive coupler of modular construction.

SUMMARY

Basically the invention includes a housing, to which are secured the incoming and outgoing ends of a coaxial cable transmission line. In the top of the housing is mounted an inductive coupler module, comprised of parallel wires sandwiched between two boards of plastic dielectric, which are inturn sandwiched between two conducting plates. The coupler connects in series with the center conductor of the transmission cable, and delivers signals taken therefrom to an output jack. The peripheral edge of the outer conducting plate of the coupler is grounded to the peripheral edges of the top and bottom of the housing.

A signal distribution circuit mounted in the bottom of the housing connects to the output jack, and delivers the signal therefrom to a selected number of subscriber taps extending outside the housing.

The invention has the following advantages.

The inductive coupler is protected from outside interference; attenuation of interference from outside the housing is 100 db or better.

Undesired inductance of the housing is eliminated by the peripheral grounding of the inductive coupler to the housing body.

The inductive coupler of the invention is constructed in modular form and can be installed or removed from the houisng without disturbing its connections to the transmission cable, or the distribution circuitry and its connecting subscriber cables.

The distribution circuitry and outlet tap configuration can be changed without disconnecting the coupler from the main cable.

The inductive coupler is electrically very stable and has a low insertion loss.

Other objectives, advantages, and various further features of novelty and invention will be pointed out or will occur to those skilled in the art from a reading of the following specification in conjunction with the accompanying drawing.

DETAILED DESCRIPTION OF PREFERRED EMBODIMENT

Figure 1:
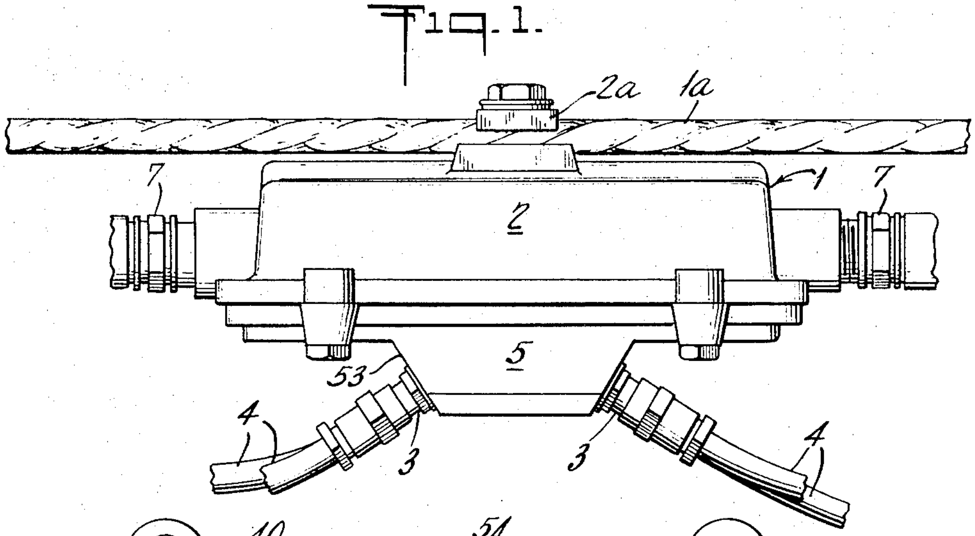
FIG. 1 is a side view of the distribution station of the invention as operationally installed with leads connected.

Referring now to FIG. 1 the distribution station of the invention is seen as operationally installed. A housing 1 of the station is suspended from a messenger wire 1*a* attached to its top 2 by a bracket 2*a*. A main transmission cable 7, is broken and attached to opposite ends of the housing. Feeder taps 3, to which are attached subscriber cables 4, extend from the bottom 5 of the housing 1 at an angle of about 30°. This angle facilitates attachment of the subscriber cables 4 and keeps them close to the messenger cable 1*a* suporting the coupler and the main cable 7.

Referring now to FIGS. 3, 4, 5, and 6 which illustrate the inductive coupler module 6 of the invention; the coupler is comprised of two parallel wires 8 and 10, placed a selected distance apart, and disposed in a circuitous pattern upon a planar surface to achieve a given electrical length. The wires are sandwiched between two boards of dielectric material 12 and 14. One of the boards 12, has grooves 8*a* and 10*a* cut in the inside surface 12*a* thereof to accommodate wires 8 and 10. The boards may be made of any dielectric material, however, polysulfone, which has stable electrical characteristics over a broad range of temperature and humidity, has been found to be most advantageous; and its use results in a coupler with greater electrical stability.

The assembly of dielectric boards 12, 14 and wires 8, 10 is itself sandwiched between parallel ground plates 18 and 20 made of conducting material such as aluminum. Three bolts 21, 22 and 23 pull ground plates 18 and 20 together enclosing wires 8 and 10.

Wire 10 is connected at its ends to terminals 24 and 26 which are set into dielectric board 12. One end of wire 8 is passed through a hole 27 in dielectric board 12, through a recess 28 in ground plate 20, and is connected to a resistor 30 which is grounded to a terminal 20*a* attached to plate 20. Resistor 30 has a value equal to the characteristic resistance of the subscribers' cables. The other end of wire 8 is similarly passed through a hole 27 in board 12, through a recess 29 in plate 20 and is connected to the center contact element 31 of a coaxial quick disconnect fitting 32 which serves as the outlet for the coupler. The housing 32*a* of quick disconnect fitting 32 is attached and grounded to plate 20, and extends through a bore 33 passing through dielectric plates 12 and 14 and ground plate 18.

Figures 2A, 2B:
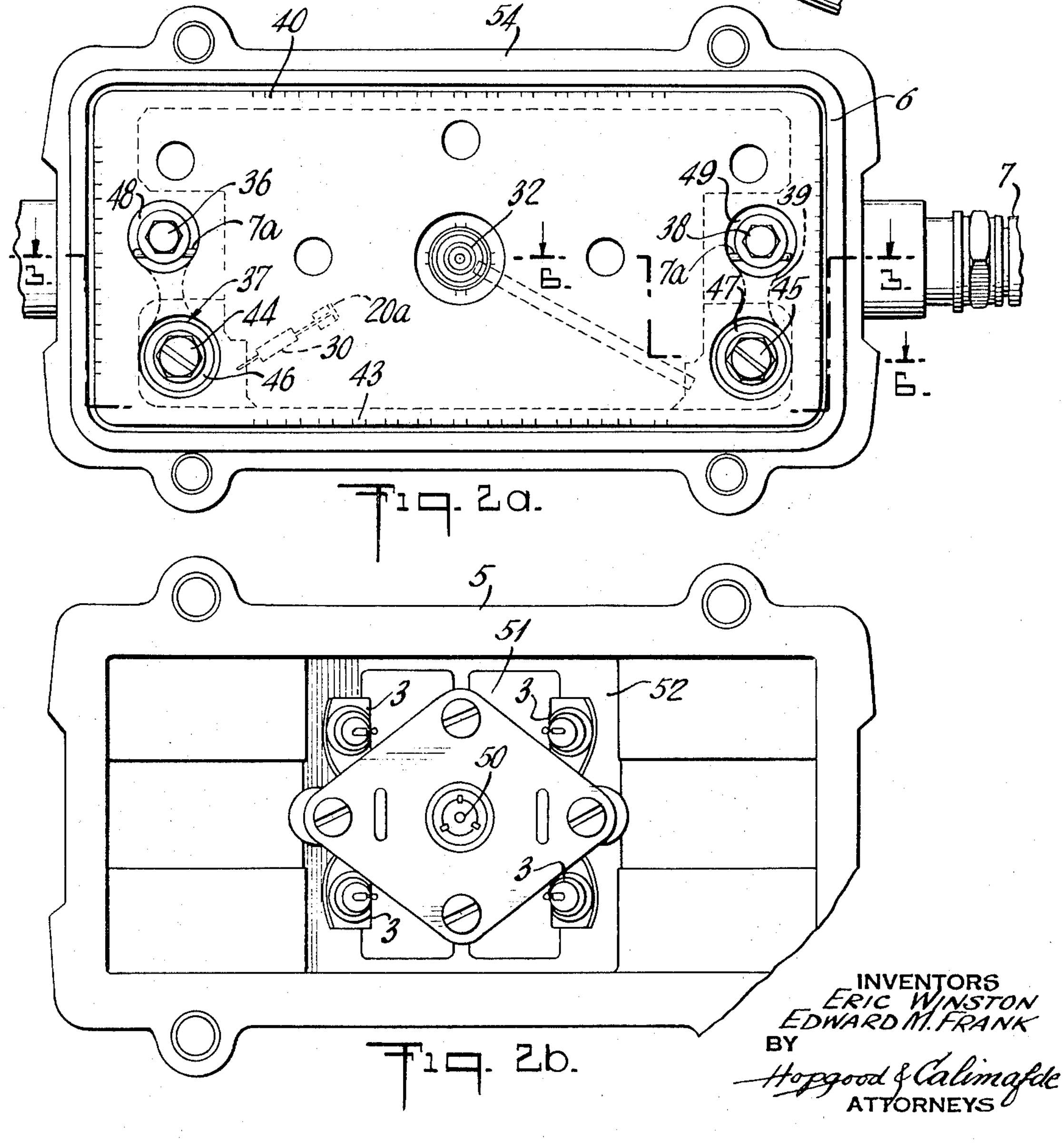
FIG. 2*a* is a plan view of the inside of the top of the station of FIG. 1 with an inductive coupler module of the invention installed therein.
FIG. 2*b* is a plan view of the inside of the bottom of the station of FIG. 1.
Figures 3, 4, 5, 6:
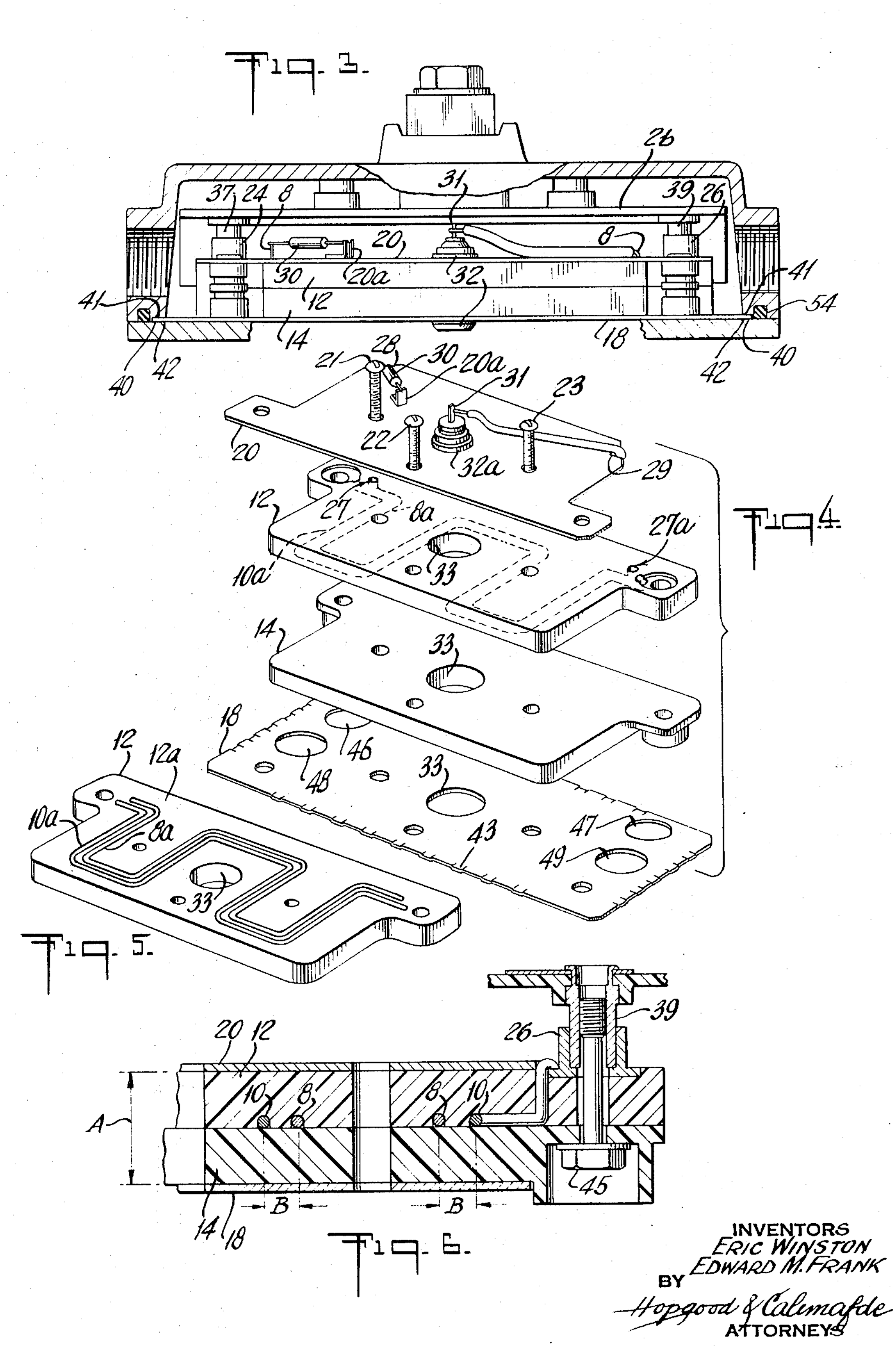
FIG. 3 is a cross sectional view of a top of the distribution station of the invention taken along line 3—3 of FIG. 2*a*.
FIG. 4 is an exploded view of an inductive coupler module of the invention.
FIG. 5 is a perspective view of a dielectric board of the coupler module of FIG. 4.
FIG. 6 is a partial sectional view of the housing top and coupler module of the invention taken along line 6—6 of FIG. 2*a*.

Referring to FIG. 2*a*, the center conductor 7*a* of cable 7 is seized at the incoming and outgoing ends by pressure terminals 36 and 38, which are electrically connected to a pair of stand-off contacts 37 and 39. Terminals 36, 38, and contacts 37 and 39 are supported and insulated from housing 1 by a plastic dielectric insert 2*b* (FIG. 3). Insert 2*b* is essentially a flat plate disposed adjacent to the inside surface of top 2; and further functions to insulate the coupler module 6 from housing 1.

Coupler module 6 is adapted to fit within top 2 of housing 1. Ground plate 18 overhangs the coupler module assembly creating a peripheral ledge 40. When module 6 is placed within the housing, ledge 40 rests upon the peripheral edge 41 of top 2, and is squeezed between edge 41 and edge 42 of the bottom of the housing when it is closed.

Small teeth 43 pressed out of the top and bottom surfaces of ledge 40 bite into edges 41 and 42 of housing 1 when it is closed, assuring lasting peripheral contact between ground plate 18 and housing 1. Housing 1 is connected to the sheath of cable 7 and together with plate 18 form an RF shield around the inductive coupler which provides attenuation of outside interference of 100 db or more. Further, by connecting the coupler directly to the peripheral edge of the housing, the undesired effects of stray or induced currents in the housing are substantially eliminated.

Referring to FIGS. 2*a* and 6, as module 6 is placed in housing top 2, terminals 24 and 26 of the coupler module mate with stand-off contacts 37 and 39, which electrically connect wire 10 in series with center conductor 7*a* of cable 7. Screws 44 and 45 thread through terminals 24 and 26 and into contacts 37 and 39 to assure firm contact, and aid in holding module 6 within top 2 when the housing is opened. (See FIG. 6).

Cut out sections 46 and 47 in ground plate 18 are provided to avoid grounding screws 44 and 45 thereto. Cut out sections 48 and 49 are provided in ground plate 18 over the position of terminals 36 and 38, to permit access thereto with module 6 installed.

When module 6 is installed in housing top 2, quick disconnect fitting 32 is in position to receive a mating connector 50, which is attached to distribution circuitry, discussed below, in the bottom 5 of housing 1. It is, therefore, possible to replace the coupler module without replacing the signal distribution circuit; or substantially disturbing the assembly of that circuit and the feeder lines.

FIGS. 1 and 2*b* illustrate the configuration of the bottom 5 of housing 1 and its contents. A hybrid signal splitter 51 (not the subject of this application) is mounted within an extended section 52 in the bottom 5 of housing 1. Splitter 51 is electrically connected to connector 50, and to feeder taps 3. Connector 50 is so mounted upon bottom 5 that it mates with fitting 32 when housing 1 is closed.

Feeder taps 3 are mounted substantially perpendicular to the outside end walls 53 of section 52. Walls 53 form an obtuse angle with the bottom of housing 1, so that taps 3 angle downwardly about 30° therefrom. One or more of such taps may be provided as needed and as space permits.

A seal 54 (FIGS. 2*a* and 3) disposed along the periphery between the top 2 and bottom 5 of housing 1, but outside of the ledge 40 of plate 18, seals the closed housing from the weather elements.

The characteristics of the inductive coupler of the invention can be varied, by changing the size of the wire, the thickness of the dielectric plates, the spacing between the wires, or the length of the circuitous course of the wires. Performance of a coupler of the invention was tested in which 0.032 in. wire was used in a coupler substantially like that illustrated in the drawings, in which the combined thickness A (see FIG. 6) of the dielectric plates was 0.344 in., and the distance B between the parallel wires was 0.055 in. The tests revealed that at the specified center frequency the insertion loss was 1.50 db and tap loss was 5.50 db.

The invention thus provides a signal distribution station which has excellent electrical characteristics, and which is structurally and functionally unique.

While the principles of the invention have been described in connection with the above specific apparatus it is to be clearly understood that this description is made only by way of example and not as a limitation to the scope of the invention as set forth in the accompanying claims.

What is claimed is:

1. An electrical signal distribution station for connection in series with a main coaxial signal carrying cable, to distribute such signals to one or more drop lines, comprised of:

a housing having top and bottom portions defining a completely enclosed interior space when connected together, and fastener means for connecting said housing portions;

means integral with said housing top portion for attaching the incoming and outgoing ends of a main signal carrying cable thereto;

input and output terminals mounted within said housing top portion for connection to the center conductor of the main signal carrying cable;

a modular inductive coupler mounted for easy removal in the top portion of said housing, comprising: first and second boards of dielectric material in face to face disposition, first and second conducting elements disposed between said boards and spaced in an energy-coupling relationship and in side-by-side parallel disposition, and means to connect said first conducting element to said input and output terminals; first and second ground plates of conducting material in contact with the backs of said first and second boards comprising the outside of said coupler module, an output connector for said coupler attached to one of said ground plates; resistive means for connecting one end of said second conducting element to one of said ground plates, and means for connecting the other end of said second conducting element to said output connector;

signal distribution circuitry mounted in the bottom portion of said housing to distribute the signal output of said inductive coupler;

quick disconnect connector means mounted in the bottom portion of said housing to mate with the output connector of the inductive coupler when said housing is closed in order to receive the output signal of said coupler and deliver the same to said signal distribution circuit; and a plurality of feeder line taps connected to said distribution circuitry and extending through the bottom wall of said housing to provide connection to a plurality of local circuits.

2. An electrical signal distribution station for connection in series with a main coaxial signal carrying cable, to distribute such signals to one or more drop lines, comprised of:

a housing having top and bottom portions, defining a completely enclosed interior space when connected together and fastener means for connecting said housing portions;

means integral with said housing top portion for attaching the incoming and outgoing ends of a main signal carrying cable thereto;

input and output terminals mounted within said housing top portion for connection to the center conductor of the main signal carrying cable;

a modular inductive coupler mounted for easy removal in the top portion of said housing, comprising: first and second boards of dielectric material in face to face disposition, first and second conducting elements disposed between said boards and spaced in an energy-coupling relationship and in side-by-side parallel disposition, and means to connect said first conducting element to said input and output terminals; first and second ground plates of conducting material in contact with the backs of said first and second boards comprising the outside of said coupler module, one of said ground plates sized so that the peripheral edges thereof overlap and make electrical contact with the edge of said top portion when said module is installed therein; an output connector for said coupler attached to one of said ground plates; resistive means for connecting one end of said second conducting element to one of said ground plates, and means for connecting the other end of said second conducting element to said output connector;

a flat dielectric plate inserted into and held by the top portion of said housing adjacent to the inside top surface thereof, said plate providing a mounting surface for said input and output terminals and also serving to insulate said coupler module from said housing;

signal distribution circuitry mounted in the bottom portion of said housing to distribute the signal output of said inductive coupler;

quick disconnect connector means mounted in the bottom portion of said housing to mate with the output connector of the inductive coupler when said housing is closed in order to receive the output signal of said coupler and deliver the same to said signal distribution circuit; and a plurality of feeder line taps mounted substantially perpendicular to the outside end walls of the bottom portion of said housing and extending therethrough, said walls forming an obtuse angle to the horizontal plane when the housing portions are connected together and in use, said taps connected to said distribution circuitry to provide signals for a plurality of local circuits.

References Cited

UNITED STATES PATENTS

| | | | |
|---|---|---|---|
| 3,012,210 | 12/1961 | Nigg | 333—10 |
| 3,164,790 | 1/1965 | Oh | 333—10 |
| 3,332,039 | 7/1967 | Oh | 333—10 |
| 3,407,366 | 10/1968 | Dworkin | 333—10 X |
| 3,209,284 | 9/1965 | Hast | 333—10 |

PAUL L. GENSLER, Primary Examiner

U.S. Cl. X.R.

333—10, 84